United States Patent [19]

Poradek, et al.

[11] 4,123,355
[45] Oct. 31, 1978

[54] SIMULTANEOUS TREATMENT OF $SO_2$ CONTAINING STACK GASES AND WASTE WATER

[76] Inventors: Robert A. Frosch, Administrator of the National Aeronautics and Space Administration, with respect to an invention of Jerry C. Poradek, Houston, Tex.; Dwight D. Collins, Bakersfield, Calif.

[21] Appl. No.: 853,705

[22] Filed: Nov. 21, 1977

[51] Int. Cl.² ........................... C02B 1/34; B01D 53/34
[52] U.S. Cl. ............................................. 210/50; 55/73; 210/60; 210/63 R; 423/242
[58] Field of Search ................. 55/73, 89; 210/45, 49, 210/50, 53, 60, 63 R; 423/213, 2, 213.5, 242, 244

[56] References Cited

U.S. PATENT DOCUMENTS

| | | | |
|---|---|---|---|
| 961,763 | 6/1910 | Falding | 423/242 X |
| 1,956,420 | 4/1934 | Gleason et al. | 210/50 X |
| 2,021,936 | 11/1935 | Johnstone | 423/242 |
| 2,073,039 | 3/1937 | Wilton et al. | 423/242 |
| 2,171,203 | 8/1939 | Urbain et al. | 210/50 |
| 3,521,752 | 7/1970 | Lindman | 210/50 X |
| 3,828,525 | 8/1974 | Copa et al. | 55/74 X |
| 3,836,630 | 9/1974 | Noguchi et al. | 423/242 |
| 3,920,794 | 11/1975 | La Mantia et al. | 423/242 |

*Primary Examiner*—Robert H. Spitzer
*Attorney, Agent, or Firm*—Carl O. McClenny; John R. Manning; Marvin F. Matthews

[57] ABSTRACT

A process for simultaneously removing sulfur dioxide from stack gases and the like and purifying waste water such as derived from domestic sewage in which a portion of the gas stream and a portion of the waste water, the latter containing dissolved iron and having an acidic pH, are contacted in a closed loop gas-liquid scrubbing zone to effect absorption of the sulfur dioxide into the waste water. A second portion of the gas stream and a second portion of the waste water are controlled in an open loop gas-liquid scrubbing zone, the second portion of the waste water containing a lesser amount of iron than the first portion of the waste water, contacting in the open loop scrubbing zone being sufficient to acidify the waste water which is then treated to remove solids originally present.

11 Claims, 1 Drawing Figure

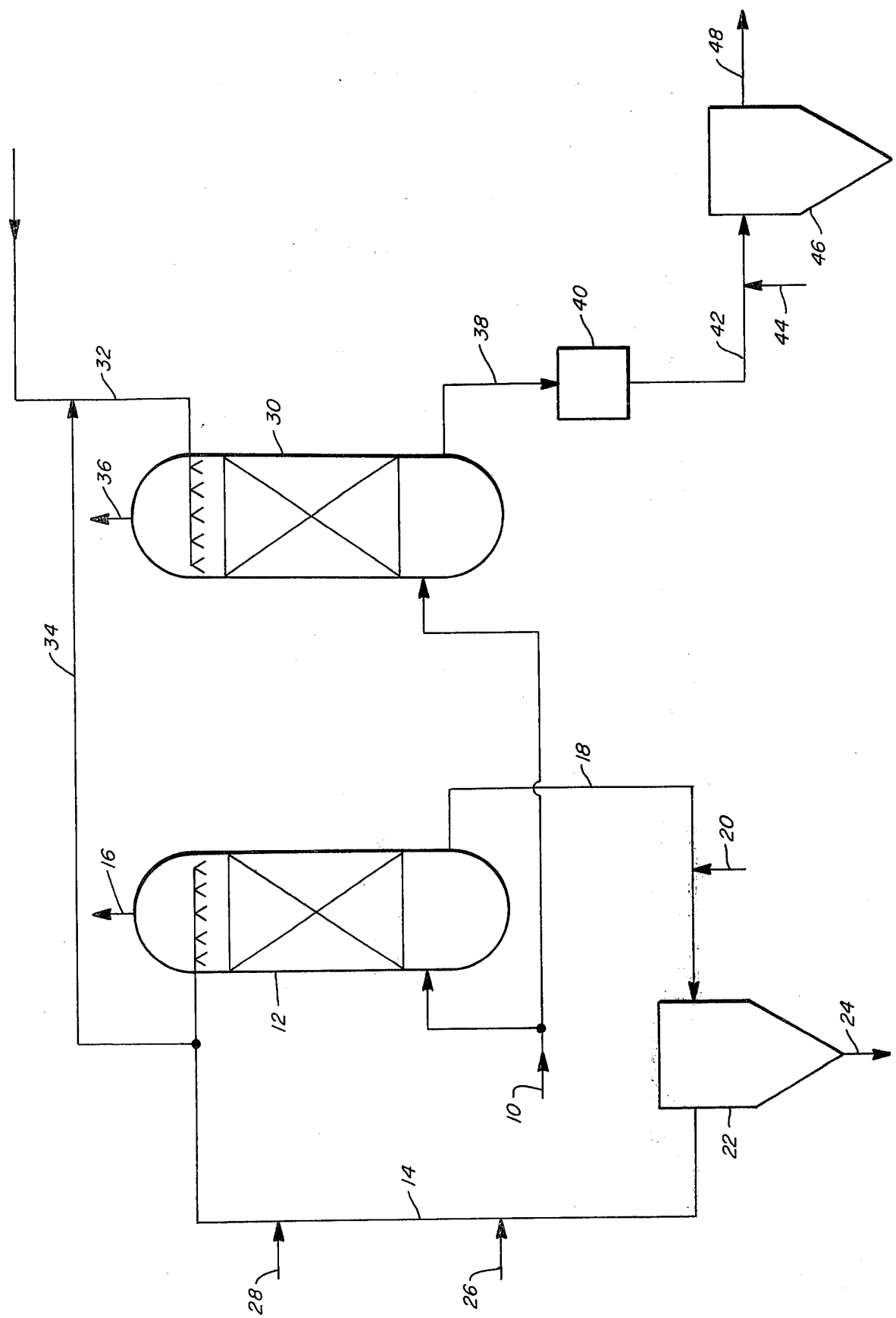

SIMULTANEOUS TREATMENT OF SO₂ CONTAINING STACK GASES AND WASTE WATER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457)

BACKGROUND OF THE INVENTION

1. Field of the Invention

The present invention relates to the treatment of stack gases and waste water streams and, more particularly, to a simultaneous process for removing sulfur dioxide from such gas streams and purifying the waste water streams.

2. Brief Description of the Prior Art

The burning of fossil fuels such as coal and oil results in the production of sulfur oxides such as sulfur dioxide. Sulfur oxides are formed by oxidation of the naturally occurring sulfur in the fossil fuels. With the energy shortage requiring the use of fossil fuels containing higher and higher amounts of sulfur, methods for the removal of sulfur dioxide from flue or stack gases and the like are becoming increasingly important.

Virtually as severe as the air pollution problem caused by the emission of sulfur dioxide laden stack gases is the pollution problem posed by the disposal of waste water from domestic sewage. The problem is especially acute in densely populated areas where literally millions of gallons of untreated or inadequately treated waste water from such domestic sewage is discharged into streams, lakes and the like. As is well known, the discharge of such inadequately treated waste water can cause severe health problems as well as being esthetically most undesirable.

It is known that $SO_2$ can be removed from gas streams such as stack gases by the use of aqueous scrubbing mediums containing various amounts of iron. Thus, for example, U.S. Pat. Nos. 2,021,936 to Johnstone and 3,836,630 to Noguchi et al. both teach methods for treating sulfur containing gas streams using scrubbing mediums containing iron. Additionally, U.S. Pat. No. 1,956,420 to Gleason et al. is typical of prior art which teaches the use of iron and iron salt coagulants and flocculants for the removal of suspended solid matter from waste water derived from raw sewage. None of the patents disclosed above teach the simultaneous treatment of sulfur dioxide laden stack gases and waste water derived from raw sewage so as to, in effect, purify one with the other. U.S. Pat. No. 3,522,173 to Lindman et al. teaches the treatment of waste water by the use of sulfur dioxide as an acidifying agent and iron as a flocculating agent to purify the waste water. However, the Lindman et al. method requires admixing the $SO_2$ gas stream with large amounts of oxygen or oxygen containing gases for the method to be effective. Moreover, the Lindman et al. process is limited to the use of gas streams containing limited amounts of $SO_2$. Thus, the Lindman et al. method is not generally applicable as a stack gas purification method absent careful control of the $SO_2$ content of the stack gas.

SUMMARY OF THE INVENTION

It is therefore an object of the present invention to provide a method for the simultaneous removal of $SO_2$ from stack gas and the purification of waste water derived from domestic sewage.

A further object of the present invention is to provide a method of removing $SO_2$ from stack gases in which the stack gas is scrubbed with an aqueous scrubbing medium comprising waste water derived from domestic sewage.

The above and other objects of the present invention will become apparent from the drawing, the description given herein and the appended claims.

In the process of the present invention, a portion of a sulfur dioxide containing gas stream, e.g. a stack gas, and a portion of a waste water stream such as derived from domestic sewage is introduced into a first scrubbing zone, the waste water containing from about 500 to about 1200 parts per million iron, the first scrubbing zone being at a relatively low pH and an elevated temperature. The contact time in the first scrubbing zone is sufficient to permit substantial oxidation of absorbed $SO_2$. The first scrubbing zone is essentially a closed loop system in which the waste water is continuously recycled through the scrubber. However, a portion, e.g. a slip stream, of the recirculating waste water in the first scrubbing zone is introduced, together with a second portion of the gas stream and a second portion of the waste water into a second scrubbing zone, the waste water in the second scrubbing zone containing an iron content lower than that in the first scrubbing zone. The $SO_2$ introduced into the second scrubbing zone acidifies the waste water to reduce the bacteria to acceptable discharge levels after which the acidified waste water is treated to remove solids originally present.

BRIEF DESCRIPTION OF THE DRAWING

The single FIGURE is a flow sheet demonstrating the method of the present invention.

DESCRIPTION OF THE PREFERRED EMBODIMENTS

The process of the present invention involves the combination of a substantially closed loop recycle scrubbing step in which maximum $SO_2$ absorption occurs coupled with a open loop scrubbing step in which primary treatment of the waste water is accomplished. Considering first the closed loop cycle, it will be understood that to efficiently remove $SO_2$ from gas streams, it is necessary that the scrubbing medium employed be able to absorb as much of the $SO_2$ as possible from the gas stream. This necessitates that the $SO_2$ be converted to a species which can be removed from the system to permit the scrubbing medium to which is absorbed more $SO_2$. The latter step can be effectively carried out by oxidizing the $SO_2$ to a species such as $SO_4^{--}$ followed by precipitation of the $SO_4$ as an insoluble salt such as for example an alkaline earth salt, e.g. $CaSO_4$. As taught by the prior art discussed above, the oxidation of $SO_2$ in a scrubbing medium is catalyzed by the addition of certain metallic ions such as iron and manganese. Accordingly, in the closed loop or recycle step of the present invention the scrubbing medium (waste water) is maintained within a certain pH range and contains relatively small but controlled amounts of iron. The controlled pH range of the waste water scrubbing medium in the closed loop scrubbing zone permits removal of the oxidized species of the SO$_2$ without a concomitant loss of iron. By controlling the contact time between the waste water and SO$_2$ laden gas, substantial oxidation of the absorbed SO$_2$ to SO$_4^{--}$ occurs and thereby the necessity for a separate oxidation stage is eliminated.

In the open loop scrubbing zone, the waste water is subjected to acidification by absorption of SO$_2$, the iron content of the waste water in the open loop scrubbing zone being considerably lower than in the closed loop scrubbing zone. The iron present in the open loop system serves to effect coagulation or flocculation of the suspended solids in the waste water thereby facilitating their removal downstream. Additionally, the acidity imparted to the waste water acts as a disinfectant and colloid destabilizer. Accordingly, the effluent from the open loop scrubbing zone can be treated for solids and phosphate removal whereupon the waste water can be disposed into lakes, streams and the like without the danger of posing serious pollution hazards.

Referring now to the drawing, a portion of a flue or stack gas in line 10 is introduced into a scrubber 12 at the bottom thereof. Also entering scrubber 12 via line 14 is a recirculating stream of waste water containing dissolved iron, preferably about 500 to 1200 ppm by weight. The waste water flow downwardly through suitable packing in scrubber 12 and countercurrently contacts the stack gas flowing upwardly. Scrubbed gas is vented from scrubber 10 via line 16. Because of the catalytic effect of the iron present in the waste water scrubbing medium, the contact time between the gas and the scrubbing medium, and the oxidizing environment provided by the presence of air in the system, the waste water which leaves scrubber 12 via line 18 contains sulfate ions, the oxidation product of the SO$_2$ initially absorbed in scrubber 12.

It will be understood that because of the formation of certain by-products resulting from the oxidation of the SO$_2$ in the waste water in scrubber 12, the waste water removed via line 18 is highly acidic. In order to adjust the pH of the highly acidic, waste water scrubbing medium to the desired range, an alkaline material is admixed with the waste water scrubbing medium, the alkaine material being introduced into the system via line 20. In the preferred case, the alkaline material is calcium oxide or, more generally, lime which may be introduced as a solid or as a slurry, the water solubility of lime being relatively small. The calcium ions thus introduced into the system via line 20 combine with sulfate ions to form calcium sulfate which, under the pH conditions existing, will precipitate and is separated in solid-liquid separator 22. The separated calcium sulfate is removed from separator 22 via line 24. It will be understood that if the sulfate concentration is below a certain predetermined level, precipitation of the calcium sulfate can be omitted. The waste water scrubbing medium, free of precipitated calcium sulfate, leaves solid-liquid separator 22 via line 14 for recycle to scrubber 12. Make-up waste water to replenish that which is removed from the closed loop system, in a manner hereinafter described or which is lost in a solid-liquid separator 22, is added to the circulation loop via line 26. It will also be appreciated that small amounts of iron will be lost in separator 22. Accordingly, in order to maintain the iron level in the desired range, iron, in suitable form and as needed, is introduced into the circulating loop via line 28.

A second portion of the stack gas in line 10 is introduced into the bottom of scrubber 30. Also entering scrubber 30 via line 32 is a second portion of waste water. The waste water entering scrubber 30 via line 32 is admixed, via line 34 with a slip stream of the recirculating waste water from line 14. The recirculating waste water in line 14 is admixed with the waste water in line 32, in an amount, so as to provide a waste water stream entering line 30 of considerably lower iron content than that of the waste water in the circulating waste water in line 14. The combined streams flow downwardly through suitable packing in scrubber 30 and are countercurrently contacted by the upwardly moving gas stream. The scrubbed gas is removed from scrubber 30 via line 36. The waste water flowing downwardly through scrubber 30 becomes acidic due to the formation of certain acidic by-products resulting from the oxidation of SO$_2$ in the aqueous medium. The acidified stream is removed from scrubber 30 via line 38 and is aerated in a suitable manner in aeration chamber 40. The aerated, but still acidic, treated waste water stream leaves aerator 40 via line 42. The acidity of the waste water in line 42 is adjusted to a substantially neutral state by the introduction of an alkaline material via line 44. In the preferred case, the alkaline material is calcium oxide or, more generally, lime which may be introduced as a solid or as a slurry, the water solubility of lime being relatively small. The neutralized waste water stream is introduced into a flocculator/clarifier 46 which calcium sulfate together with flocculated and precipitated solids originally suspended or dissolved in the waste water are removed. The clarified, treated waste water, which can be further aerated, is discharged from flocculator 46 via line 48.

The term "waste water" as used herein, is intended to mean water which has been derived from domestic sewage, i.e. sewage derived principally from dwellings, business buildings, institutions and the like, and may or may not contain ground water, surface water or storm water. It will be appreciated that, consistent with ensuring that the waste water sustains proper treatement, surfactants and other materials can be added to the waste water to enhance absorption of the SO$_2$, minimize scale build-up, etc. Generally speaking, the waste water from domestic sewage will contain approximately 250 parts per million of suspended solids, organic solids constituting between 40 to 70% of the total solids.

The iron content of the recirculating waste water in the closed loop scrubbing zone comprised of line 14 and scrubber 12 will range from about 500 to about 1200 ppm by weight calculated as Fe, the optimum amount being approximately 1000 ppm by weight. The iron can be added in the form of a solution of a soluble iron salt such as ferric chloride, ferric sulfate, etc. or such salts can be added directly. Alternately, the recirculating waste water scrubbing medium may be passed through a suitable container filled with scrap iron prior to being introduced into the scrubbing tower. It will also be appreciated that normal waste water will naturally contain some iron.

The temperature in the closed loop scrubbing zone will be from about 120° to about 160° F., temperatures around 140° F. being particularly desirable. The open loop temperature may be any temperature normally found in waste water. While the system can be operated at superatmospheric pressure, it is generally preferable, because of energy considerations, to employ gas liquid scrubbers and flow rates of waste water scrubbing medium and gas such that excessive pressures are not encountered.

Since it is a prime object of the process in the closed loop scrubbing zone to provide maximum $SO_2$ absorption into the waste water scrubbing medium, it is necessary that there be sufficient contact time in the closed loop scrubbing medium to ensure that substantial oxidation of the $SO_2$ to readily removable species occurs. Generally speaking, contact times of 25 seconds or greater have been found to be adequate to ensure that most of the $SO_2$ absorbed is oxidized in the scrubbing zone. Contact time, as used herein, refers to the average residence time of gas in the scrubbing zone, i.e. the average period of time in which the gas and the scrubbing liquid are in intimate contact.

One of the features of the present invention is that by controlling the pH in the closed loop scrubbing zone, the by-product calcium sulfate can be easily removed without the loss of the iron catalyst. Additionally, low pH ensures that the slip stream removed for transfer to the open loop scrubbing zone will have a reduced bacteria content. It has been found that a pH of from about 1.5 to about 3 and preferably about 2 is most desirable.

An advantage of the process of the invention is that in the closed loop scrubbing zone, scrubbing can be effectively accomplished using relatively low L/G ratios, where the L/G ratio refers to gallons of scrubbing medium "waste water" per thousand cubic feet of gas to be scrubbed. This is an important consideration since high liquid volumes of scrubbing medium require higher energy consumption for pumps to circulate the waste water. It will be understood however, that the L/G ratio employed will depend upon parameters such as the dimensions of the scrubbing power, the amount of packing, the concentration of the $SO_2$ in the gas and other such parameters. However, in general for normal flue or stack gas streams, L/G ratios of from about 30 to about 70 have been found to be quite acceptable.

To control or adjust the pH of the waste water streams in either the closed or open loops scrubbing zones, any alkaline material which will not interfere with the precipitation of dissolved or suspended solids in the waste water can be employed. Thus, any alkaline material such as for example, an alkaline metal hydroxide or carbonate can be used. Additionally, alkaline materials such as alkaline earth metal oxides and hydroxides can be used quite advantageously. It is preferable that an alkaline earth metal oxide or hydroxide and especially calcium oxide (lime) or hydroxide may be used as the pH controlling material. The use of calcium oxide, as for example, in the form of lime, leads to the formation of calcium sulfate, which, under proper pH conditions will precipitate from the waste water and can be removed from the system. Indeed, the continuous removal of precipitated calcium sulfate from the system provides a convenient way to continuously remove the $SO_2$ being absorbed into the waste water. Removal of calcium sulfate in the closed loop scrubbing zone is also desirable since it prevents the solid from being carried over into the open loop scrubbing zone. A particular advantage of the process of the present invention lies in the fact that, in the closed loop scrubbing zone, which uses relatively low levels of iron, the calcium sulfate can be selectively precipitated without effecting the precipitation of the iron. Thus, except for small amounts of iron which are physically lost by precipitation of calcium sulfate, the iron level in the circulating waste water in the closed loop scrubbing zone can be kept relatively constant, the amount of make-up iron needed being kept relatively small.

The iron content in the waste water passing through the open loop scrubbing zone, i.e. line 32 and scrubber 30, should be in the range of about 50 to about 200 parts per million by weight, calculated as Fe and preferably around 100 ppm. It has been found that this range of iron will provide optimum flocculation and settling of solids in the downstream clarifier. While it will be appreciated that the incoming waste water will contain some iron, the iron content of the waste water in the open loop scrubbing zone is best controlled, as described above, by admixing the feed stream of waste water to the open loop scrubbing zone with a slip stream of the circulating waste water from the closed loop scrubbing zone. Thus, by metering the slip stream having a known iron content into the feed waste water to the open loop scrubbing zone, the desired iron content in the closed loop scrubbing zone can be achieved.

In order to assure that the waste water leaving the closed loop scrubbing zone is suitable for discharge, it is necessary that sufficient $SO_2$ containing gas be passed through the open loop scrubbing zone to ensure that the pH of the waste water discharged from the open loop scrubbing zone is from about 1.5 to about 3 and preferably about 2. The lower pH not only aids in purifying the waste water by killing bacteria but contributes to a favorable L/G ratio in the open loop scrubbing zone. Contact time in the open loop scrubbing zone can vary widely. However, because of the fact that some oxidation of $SO_2$ beyond $SO_3^{--}$ to $SO_4^{--}$ occurs in the open loop scrubbing zone, it is preferred that contact times of 25 seconds or longer be employed.

In order to ensure efficient precipitation of solids from the waste water leaving the open loop scrubbing zone, it is necessary to adjust the pH to a range of about 6.5 to about 7.2. This can be accomplished, as described above, by the use of a suitable alkaline material such as for example, lime. Additionally, neutralization of the acidic waste water is necessary before it can be safely discharged without posing a pollution problem. It has also been found desirable to aerate the treated waste water leaving the open loop scrubbing zone to ensure better flocculation and hence precipitation of solids in the clarifier. Aeration can be accomplished using spargers or the like in a well known manner.

Numerous types of gas-liquid scrubbing apparatuses can be employed in the process of the present invention. Particularly preferred gas-liquid contactors are packed spray columns in which the waste water scrubbing medium is introduced at the upper part of the column in the form of a spray passing downwardly through a suitably packed column, the downwardly flowing waste water contacting the counter flowing gas stream moving upwardly through the column. Such packed columns for effecting gas-liquid scrubbing are well known and widely used in the art. Other types of scrubbers can also be used, the main criterian being, at least in the case of the closed loop scrubber, that it be of a type allowing sufficient contact time between the gas and waste water scrubbing medium to ensure oxidation of the absorbed $SO_2$.

To more fully illustrate the invention, the following nonlimiting example is presented. The scrubbers used were vertical columns having a diameter of two feet and containing approximately 16 feet of suitable packing.

EXAMPLE

The tests were conducted using a process flow scheme substantially as shown in the accompanying figure. The gas stream employed was a diesel engine exhaust into which was metered sufficient $SO_2$ to raise the concentration of the $SO_2$ in the gas stream to about 1000 ppm by weight. The waste water scrubbing medium used was derived from domestic sewage. Sufficient iron was added to the waste water circulating in the closed loop scrubbing zone to give an iron content of approximately 1000 ppm be weight calculated as Fe. The temperature in the closed loop scrubber was maintained at approximately 140° F. The flow rate of the waste water scrubbing medium through the closed loop scrubber was controlled at a rate such that the contact time in the scrubber was in excess of 25 seconds. The pH of the circulating waste water in the closed loop scrubbing system was maintained at a range of about 2 to 2.5. It was found that removal of $SO_2$ from the gas stream passing through the closed loop scrubber was between 85 to 95%. Waste water entering the open loop scrubbing zone was admixed with a sufficient amount of waste water from the closed loop scrubbing zone to ensure that the iron content of the waste water scrubbing medium in the open loop scrubbing zone was about 100 ppm by weight. Gas flow rate to the open loop scrubber was sufficient to ensure that absorbed $SO_2$ would maintain the pH at 2.5 or less. The treated waste water removed from the open loop scrubbing zone was neutralized with calcium oxide and sent to a clarifier to permit flocculation and precipitation of the solids. It was found that aeration prior to neutralization tended to produce faster and more efficient flocculation. The results on two different waste water samples are shown below in Tables I & II.

Table I

|  | Raw Sewage | Best Aerated Sample |
|---|---|---|
|  | (mg/l) |  |
| COD | 3160 | 1440 |
| Ammonia | 26 | 18 |
| Phosphate | 85 | .4 |
| Coliform | greater than 16 | 9.2 |
| pH | 5.7 | 8.6 |
| $SO_4$ | less than 15 | 456 |

Table II

|  | Raw Sewage |  | Best Aerated Sample |
|---|---|---|---|
|  | (mg/l) |  |  |
| BOD | 336 |  | 104 |
| COD | 642 |  | 180 |
| Sol. COD | 327 |  |  |
| Ammonia | 17 |  | 9.7 |
| Phosphate | 12 |  | .3 |
| Coliform | greater than 16 | less than | 2.2 |
| pH | 6.3 |  | 7.8 |
| $SO_4$ | less than 15 |  |  |

As can be seen from the above examples, the present invention provides a process whereby $SO_2$ laden gas such as stack gas and waste water derived from domestic sewage can be simultaneously treated to effect removal of the $SO_2$ from the gas and purify the waste water to the point where it can be safely discharged into streams, lakes and other such bodies of water.

From the above description, it is apparent that numerous modifications may be made in the process of the present invention without departing from the spirit or scope thereof. Accordingly, it is intended that the invention be limited only by the appended claims.

We claim:

1. A process for the simultaneous treatment of a sulfur dioxide containing gas stream and waste water of the type derived from domestic sewage comprising:

introducing a first portion of said gas stream and a first portion of said waste water into a first gas-liquid scrubbing zone, said first portion of said waste water containing from about 500 to about 1200 parts per million iron and having a pH of from about 1.5 to about 3, the temperature in said first scrubbing zone being from about 120° to about 160° F., contacting said first portion of said gas stream and said first portion of said waste water in said first scrubbing zone to absorb $SO_2$ into said waste water, the contact time in said scrubbing zone being sufficient to permit substantial oxidation of absorbed $SO_2$, said waste water being recycled through said first scrubbing zone, introducing a second portion of said gas stream, a portion of said recirculating waste water from said first scrubbing zone, and a second portion of said waste water into a second gas-liquid scrubbing zone, said second portion of said waste water in said second scrubbing zone containing from about 50 to about 200 parts per million iron, contacting said second portion of said gas stream with said second portion of said waste water in said second scrubbing zone to absorb $SO_2$ into said second portion of said waste water and acidify said second portion of said waste water, removing said acidified waste water from said second scrubbing zone, and treating said acidified waste water removed from said second scrubbing zone to remove solids originally present in said waste water.

2. The process of claim 1 including adding an alkaline material to the gas contacted waste water from said first scrubbing zone to adjust the pH.

3. The process of claim 2 wherein the portion of the treated, gas contacted waste water being recycled through said first scrubbing zone introduced into said second scrubbing zone is such as to maintain the desired iron content of said second portion of said waste water.

4. The process of claim 2 wherein said alkaline material comprises calcium oxide.

5. The process of claim 4 wherein said calcium oxide is in the form of lime.

6. The process of claim 4 including removing precipitated calcium sulfate from said treated, gas contacted waste water.

7. The process of claim 1 wherein said first portion of said gas stream and said first portion of said waste water are contacted by passing said first portion of said gas stream in counterflow relation to said first portion of said waste water.

8. The process of claim 1 wherein the pH of said first portion of said waste water is about 2.0.

9. The process of claim 1 wherein said contact time in said first scrubbing zone is greater than 25 seconds.

10. The process of claim 1 wherein said contacting in said first scrubbing zone is conducted in a packed column.

11. The process of claim 1 including aerating said acidified, waste water from said second scrubbing zone prior to removing said solids.

* * * * *